United States Patent
Böhm et al.

(10) Patent No.: US 10,554,004 B2
(45) Date of Patent: Feb. 4, 2020

(54) SONOTRODE, DEVICE AND METHOD FOR PRODUCING A JOIN

(71) Applicant: TELSONIC HOLDING AG, Bronschhofen (CH)

(72) Inventors: Markus Böhm, Nürnberg (DE); Thomas Hünig, Grosswallstadt (DE)

(73) Assignee: TELSONIC HOLDING AG, Bronschhofen (CH)

( * ) Notice: Subject to any disclaimer, the term of this patent is extended or adjusted under 35 U.S.C. 154(b) by 35 days.

(21) Appl. No.: 15/747,481

(22) PCT Filed: Jul. 13, 2016

(86) PCT No.: PCT/EP2016/066652
§ 371 (c)(1),
(2) Date: Jan. 25, 2018

(87) PCT Pub. No.: WO2017/016875
PCT Pub. Date: Feb. 2, 2017

(65) Prior Publication Data
US 2018/0219345 A1    Aug. 2, 2018

(30) Foreign Application Priority Data
Jul. 29, 2015    (DE) .................. 10 2015 214 408

(51) Int. Cl.
*B23K 1/06* (2006.01)
*H01R 43/02* (2006.01)
(Continued)

(52) U.S. Cl.
CPC ....... *H01R 43/0263* (2013.01); *B23K 20/106* (2013.01); *H01R 4/187* (2013.01); *H01R 43/0207* (2013.01); *B23K 2101/38* (2018.08)

(58) Field of Classification Search
CPC ............ H01R 43/0263; H01R 4/187; H01R 43/0207; B23K 2101/38; B23K 20/10–106; B23K 1/06
(Continued)

(56) References Cited

U.S. PATENT DOCUMENTS

| | | | | | |
|---|---|---|---|---|---|
| 3,184,841 | A | * | 5/1965 | Jones ................ | B23K 20/10 228/1.1 |
| 3,319,984 | A | * | 5/1967 | Jones ................ | B23K 20/10 228/1.1 |

(Continued)

FOREIGN PATENT DOCUMENTS

| | | |
|---|---|---|
| DE | 38 06 544 A1 | 9/1989 |
| DE | 20 2004 010 775 U1 | 3/2005 |

(Continued)

OTHER PUBLICATIONS

Machine translation of DE-3806544A1 (no date available).*

(Continued)

*Primary Examiner* — Kiley S Stoner
(74) *Attorney, Agent, or Firm* — Davis & Bujold PLLC; Michael J. Bujold

(57) ABSTRACT

A sonotrode (18) for producing a welded and/or soldered join between a cable (17) and a sheath (17), covering the cable (17), comprising at least one working surface (2). The working surface (2) is curved in a concave manner, at least in sections. An anvil (10) comprises at least one counter surface (11) which is curved in a concave manner, at least in sections. The device for producing the join between a cable (17) and a sheath (17), covering the cable (17), comprises a sonotrode (18) joined to an ultrasound source (8) at least at a joining surface (5), and comprising an anvil (10) arranged opposite the working surface (2) of the sonotrode (18). A (Continued)

method for producing a join between a cable (17) and a sheath (17) covering the cable (17) is also disclosed.

17 Claims, 7 Drawing Sheets

(51) Int. Cl.
*H01R 4/18* (2006.01)
*B23K 20/10* (2006.01)
*B23K 101/38* (2006.01)

(58) Field of Classification Search
USPC .................. 228/110.1, 1.1; 156/580.1–580.2
See application file for complete search history.

(56) References Cited

U.S. PATENT DOCUMENTS

| | | | | |
|---|---|---|---|---|
| 3,440,118 A * | 4/1969 | Obeda | ............... | B23K 20/10 156/580.2 |
| 3,822,465 A * | 7/1974 | Frankort | ............... | B23K 20/10 228/111 |
| 4,596,352 A * | 6/1986 | Knapp | ............... | B23K 20/106 228/1.1 |
| 5,147,082 A * | 9/1992 | Krause | ............... | B23K 20/106 228/1.1 |
| 5,298,715 A * | 3/1994 | Chalco | ............... | B23K 1/0056 219/121.64 |
| 5,379,512 A * | 1/1995 | Ingle | ............... | H05K 1/09 228/54 |
| 5,620,555 A * | 4/1997 | Choudhury | ............... | B29C 65/08 156/580.2 |
| 5,816,472 A * | 10/1998 | Linn | ............... | B23K 20/004 228/1.1 |
| 6,021,565 A * | 2/2000 | Shinchi | ............... | H01R 43/0207 29/749 |
| 6,100,511 A * | 8/2000 | Kempe | ............... | B23K 20/10 219/679 |
| 6,638,384 B1 * | 10/2003 | Edwards | ............... | A46B 5/06 156/173 |
| 7,392,923 B2 | 7/2008 | Stroh et al. | | |
| 8,657,182 B2 | 2/2014 | Buettiker | | |
| 9,601,889 B2 | 3/2017 | Ito et al. | | |
| 9,855,623 B2 * | 1/2018 | Regenberg | ............... | B23K 20/106 |
| 9,941,606 B1 * | 4/2018 | Hashimoto | ............... | H01R 9/0515 |
| 9,941,646 B1 * | 4/2018 | Hashimoto | ............... | H01R 9/0515 |
| 2004/0088857 A1 * | 5/2004 | Fujimoto | ............... | H01R 11/12 29/871 |
| 2005/0205641 A1 * | 9/2005 | Takeuchi | ............... | B23K 1/06 228/1.1 |
| 2006/0065697 A1 | 3/2006 | Kobae et al. | | |
| 2011/0062218 A1 * | 3/2011 | Ohnuma | ............... | B23K 20/106 228/110.1 |
| 2012/0298645 A1 * | 11/2012 | Kleespiess | ............... | H01R 4/029 219/137 R |
| 2013/0075454 A1 | 3/2013 | Buettiker | | |
| 2013/0240606 A1 * | 9/2013 | Lang | ............... | B23K 20/106 228/1.1 |
| 2013/0299558 A1 * | 11/2013 | Lang | ............... | B23K 20/10 228/1.1 |
| 2014/0166730 A1 * | 6/2014 | Taylor | ............... | B23K 3/02 228/110.1 |
| 2014/0311798 A1 * | 10/2014 | Numata | ............... | H02G 15/06 174/75 R |
| 2016/0023297 A1 * | 1/2016 | Stroh | ............... | B23K 20/106 228/1.1 |
| 2016/0342179 A1 * | 11/2016 | Osborne | ............... | G06F 1/16 |

FOREIGN PATENT DOCUMENTS

| | | |
|---|---|---|
| DE | 10 2010 029 395 A1 | 11/2011 |
| DE | 11 2011 102 335 T5 | 4/2013 |
| DE | 10 2013 212 331 A1 | 10/2014 |
| EP | 0 143 936 A1 | 9/1984 |
| EP | 0572153 A2 * | 12/1993 ........... B29C 65/082 |
| EP | 1 566 233 A1 | 2/2005 |
| EP | 1 543 911 A1 | 6/2005 |

OTHER PUBLICATIONS

Machine translation of DE-202004010775U1 (no date available).*
International Search Report Corresponding to PCT/EP2016/066652 dated Sep. 27, 2016.
Written Opinion Corresponding to PCT/EP2016/066652 dated Sep. 27, 2016.

* cited by examiner

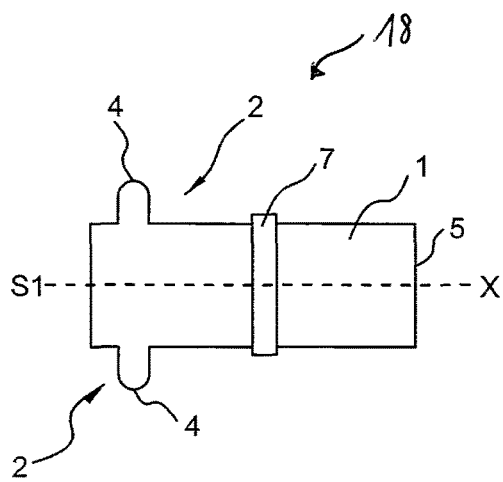
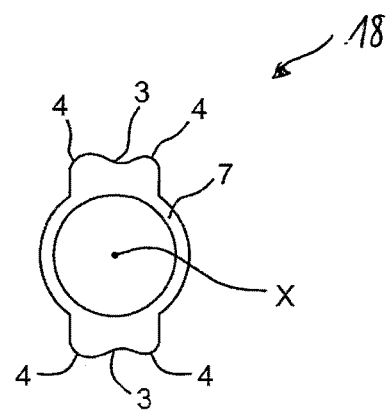
FIG. 1            FIG. 2
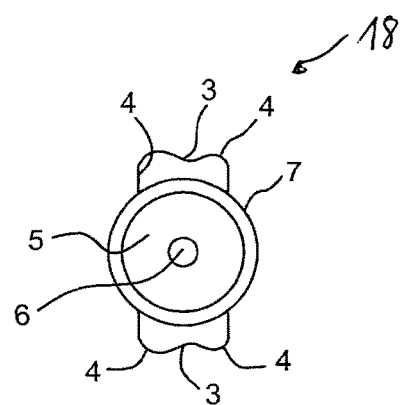
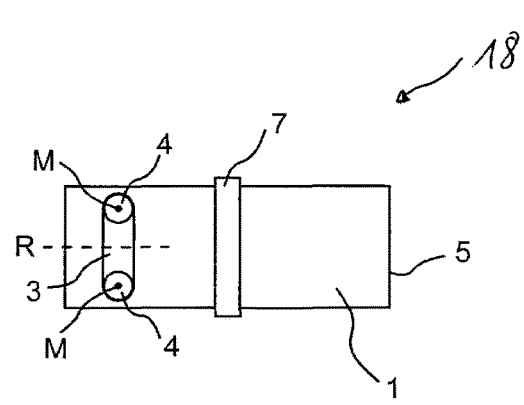
FIG. 3            FIG. 4

SONOTRODE, DEVICE AND METHOD FOR PRODUCING A JOIN

The invention relates to a sonotrode according to the preamble of claim 1. It also relates to an apparatus and to a method using the sonotrode.

Such a sonotrode is known from DE 10 2013 212 331 A1. The known sonotrode has a symmetrical mass distribution with regard to a first plane of symmetry. It is delimited by two round connecting faces, extending perpendicularly to the first plane of symmetry, for connecting to ultrasonic sources. An axis of the sonotrode extends through the connecting faces and the first plane of symmetry. The sonotrode has two mutually opposite working faces which extend from its circumferential face. The working faces are each curved in a convex or ridgelike manner in a first profile extending parallel to the axis. A ridgeline of the curved working face extends perpendicularly to an axis of the sonotrode. The ridgeline of the working face is configured in a straight manner. During the production of a welded connection between a tubular cable lug and a cable, a groove corresponding to the working face is pressed into a tubular portion of the tubular cable lug.

DE 11 2011 102 335 T5 discloses a method for connecting a tubular cable lug to a cable. In said method, the cable is partially melted by means of ultrasonic vibrations and a connection to the tubular cable lug is produced.

DE 10 2010 029 395 A1 discloses a torsion sonotrode in which a torsion axis is perpendicular to connecting faces for connecting to an ultrasound generating apparatus or ultrasonic source. Between the connecting faces, protrusions having working faces configured in a substantially flat manner extend from the circumference of the cylindrical sonotrode in an arrangement located opposite one another. The working faces extend in the direction of the axis or torsion axis of the torsion sonotrode.

In order to produce a connection between a tubular cable lug and a cable, the cable is plugged into the tubular portion of the tubular cable lug. Then, the tubular cable lug is firmly clamped to an anvil in the region of a connection terminal extending from the tubular portion. Subsequently, the sonotrode is pressed into the region of the tubular portion and a joint, in particular a welded connection and/or a soldered connection, is produced between the cable and the tubular portion of the tubular cable lug by means of ultrasonic vibration.

Both the working faces of a sonotrode and the opposite counterpart face of the anvil are usually structured according to the prior art such that a relative movement between the part or parts clamped between the anvil and sonotrode is prevented as far as possible. This has the consequence that the structures provided on the working faces and the anvil are impressed into the surface of the parts to be connected, in particular to be welded and/or soldered. Such a change in the surface is undesired in particular in electrical components, for example connection terminals, on account of contact problems that result therefrom. In addition, high temperatures and rapid wear to the working face and counterpart face often occur on account of the structuring during connection. The wear is particularly pronounced in nickel-plated tubular cable lugs.

The object of the invention is to remedy the drawbacks of the prior art. In particular a sonotrode is intended to be specified which allows the production of a joint, in particular a welded joint and/or a soldered joint, between a cable and a sheath covering the cable with a simultaneous reduction in damage to and/or deformation of the surface of the component to be connected, in particular to be welded and/or soldered. According to a further objective of the invention, an apparatus and a method for producing a joint, in particular a welded joint and/or a soldered joint, using the sonotrode are intended to be specified.

This object is achieved by the features of the independent claims. Expedient configurations of the invention can be gathered from the features of the dependent claims.

In a first aspect, the invention relates to a sonotrode for producing a joint between a cable and a sheath covering the cable. The joint can be a welded joint and/or a soldered joint. The sheath can be for example a sleeve, in particular a metal sleeve, in particular a metal sleeve (i.e. a tubular portion) of a tubular cable lug, which is plugged onto the cable. As an alternative to a sleeve, the sheath can also be a wrapping of part of the cable.

The invention proposes that the working face be concavely curved at least sectionally in a second profile. Preferably, the working face is concavely curved in the second profile. As a result of the concave curvature, proposed according to the invention, of the working face in a second profile, the sonotrode acts in a "self-centering" manner when a pressure or force is exerted on the sheath, in particular the metal sleeve. This effect is particularly pronounced when the second profile extends perpendicularly to an axis, explained below, of the sonotrode. When the working face is moved against the sheath, the sheath is shifted such that an axis of longitudinal extent of the sheath is oriented in a manner following the concave curvature of the working face. If the sheath, in particular the metal sleeve, is configured in a cylindrical manner, a cylinder axis of the sheath is oriented approximately parallel to the axis of the sonotrode.

According to the invention, it is no longer necessary to firmly clamp the sheath, in particular the metal sleeve, to the anvil. Thus, damage to the surface of the sheath or a component having a sheath, for example a tubular cable lug, can be avoided. The sheath merely has to be positioned opposite the working face, in particular laid on the anvil, specifically such that an axis of longitudinal extent of the sheath is approximately aligned with the axis of the sonotrode, i.e. the sheath should be arranged such that the direction of longitudinal extent thereof forms an angle of at most 60°, preferably at most 45°, particularly preferably at most 30°, with the axis of the sonotrode.

The cable can be for example a copper cable or an aluminum cable.

In order to achieve a balancing of masses and, in particular during torsion welding and/or torsion soldering, to avoid an imbalance as far as possible, it is advantageous for the sonotrode to have a symmetrical mass distribution with regard to a first plane of symmetry.

The sonotrode may furthermore have a connecting face for connecting to an ultrasonic source. Advantageously, the connecting face extends perpendicularly to the first plane of symmetry.

It is further advantageous for the sonotrode to contain an axis extending through the connecting face and the first plane of symmetry, and for the at least one working face to extend from a circumferential face of the sonotrode in a direction perpendicular to this axis. This results in the advantages already explained above.

It is particularly advantageous for the working face to be convexly curved at least sectionally in a first profile extending parallel to the axis, and in particular convexly curved. As a result, during the production of a joint, in particular a welded joint and/or a soldered joint, between a sheath, for example a tubular portion of a tubular cable lug, and a cable, a groove corresponding to the working face can be pressed into the sheath, this serving inter alfa to increase the stability of the joint.

In the scope of the invention, the first profile can also be formed in a straight or concave manner, or it can have convex portions and/or straight portions and/or concave portions. In this way, further advantageous contours can be impressed into the sheath.

It is likewise advantageous for the second profile, in which the working face is concavely curved at least sectionally, to extend perpendicularly to said axis of the sonotrode.

The working face can have one or more ridgelike portions. The ridgelike portion can extend along, transversely to or at any desired other angle to the axis of the sonotrode. A plurality of, for example two, ridgelike portions can also extend at different angles to the axis of the sonotrode. In particular, two or more ridgelike portions of the working face can intersect, for example at a right angle. In this way, one or more grooves can be impressed into the sheath, it being possible for these grooves to extend along, transversely to or at any desired other angle to the axis.

According to one advantageous configuration of the invention, the working face is curved through an angle of 90° to 180° in the first profile. Expediently, the first profile is formed in the manner of a full bead. The first profile can in this case be configured in a semicircular manner.

The first profile is expediently formed in a symmetrical manner. A radius of curvature of the first profile can be uniform or variable.

According to a further configuration, the second profile is concavely curved sectionally. In this case, the second profile can have a groove which is configured such that when a pressure or force is exerted on the sheath by means of the working face, the sheath is forced into a defined position with regard to the working face.

The "groove" within the meaning of the present invention is advantageously configured such that upon contact of the two groove edges with the surface of the sheath, a groove bottom located centrally between the groove edges does not come into contact with the surface of the sheath, i.e. a gap initially remains between the groove bottom and the surface of the sheath. As a result, it is possible for the groove edges to initially slide along the surface of the sheath and thus to move the sheath into the defined position with regard to the working face. Only upon subsequent exertion of a pressure or force on the working face does the groove bottom also come into contact with the sheath.

In the scope of the invention, the second profile can also be formed in a sectionally convex manner, as long as it is formed at least sectionally in a concave manner according to the invention. In this way, advantageous contours can be impressed into the sheath.

According to one advantageous configuration of the invention, the working face has in each case a protruding and in particular humplike pressure face on either side of the groove. In other words, the groove edges are each formed as protruding and in particular humplike pressure faces. The humplike configuration of the pressure face allows the sheath to slide in a substantially friction-free manner on the pressure faces and thus quick and exact setting of the defined position with regard to the working face.

According to a further advantageous configuration, the concave curvature of the second profile extends along the entire length of the working face. The expression "length of the working face" is understood to mean the distance between the two highest points that delimit the concave curvature of the second profile.

The surface of the working face may have a mean roughness $R_a$ of at most 0.4 μm, preferably 0.1 μm. In contrast to the prior art, the pressure faces, or the working face, are configured in a smooth, preferably polished, manner. Preferably, it thus does not have any surface structure, for example protrusions, ribs or the like. Surprisingly, however, a joint, in particular a welded joint and/or soldered joint, between the cable and the sheath is successfully produced with such smoothly configured working faces by means of ultrasonic welding methods. It is currently presumed that the joint is achieved by rolling of the cable and the sheath. The lack of a surface structure also has the effect that the friction between sonotrode, sheath and anvil is increased and as a result the development of heat is enhanced. It is currently presumed that, as a result, a cohesive connection between sheath and cable is achieved within the sheath in cooperation with the welding force. Furthermore, the lack of a surface structure has the advantage that the wear to the working face is reduced. As a result, longer and greater energy input is possible.

The sonotrode may be a torsion sonotrode. In this case, the axis of the sonotrode is a torsion axis. However, the sonotrode can also be a longitudinal sonotrode. In this case, the axis of the sonotrode corresponds to a direction of propagation of the longitudinal waves.

According to a further advantageous configuration of the invention, two mutually opposite connecting faces are provided, such that respective ultrasonic sources are connectable to each of the connecting faces. The ultrasonic source expediently comprises at least one converter, in particular for generating a torsional or a longitudinal ultrasonic vibration, wherein the converter is connected to the connecting face directly or indirectly via a booster.

A radially circumferentially offset contact face for the action of a pressure generating device is expediently provided between each connecting face and the working face. The contact face can protrude outward radially circumferentially. By means of this pressure generating device, a pressure acting in the direction of the anvil or a force acting in the direction of the anvil can be generated. Alternatively or additionally, the apparatus can comprise a pressure generating device, acting on a contact face of the anvil, for generating a pressure acting in the direction of the sonotrode or a force acting in the direction of the sonotrode.

A further aspect of the apparatus relates to an anvil having at least one counterpart face. The counterpart face is arrangeable opposite a working face of a sonotrode in order to produce a joint, in particular a welded joint and/or soldered joint, between a cable and a sheath covering the cable, in particular between a cable and a sleeve, in particular a metal sleeve, in particular a metal sleeve of a tubular cable lug, plugged onto said cable. According to the invention, the counterpart face is concavely curved at least sectionally in a second profile, and in particular concavely curved. The counterpart face of the anvil according to the invention is thus configured analogously to the working face of the sonotrode according to the invention. As has been surprisingly found in particular with respect to the first aspect of the invention, many of the advantages already explained above can also be achieved with such an anvil and a conventional sonotrode.

The counterpart face may be convexly curved at least sectionally in a first profile extending perpendicularly to the second profile, and in particular convexly curved. The counterpart face may be curved through an angle of 90° to 180° in the first profile. The counterpart face may be formed in the manner of a full bead in the first profile. The second profile of the counterpart face may be concavely curved sectionally. The second profile of the counterpart face may have a groove which is configured such that when a pressure or force is exerted on the sheath by means of the counterpart face, the sheath is forced into a defined position with regard to the counterpart face. The counterpart face may have in each case a protruding and in particular humplike pressure face on either side of the groove. The concave curvature of the second profile of the counterpart face may extend along an entire length of the counterpart face. A surface of the counterpart face may have a mean roughness $R_a$ of at most 0.4 μm, preferably at most 0.1 μm.

According to a further aspect of the invention, an apparatus is provided for producing a joint, in particular a welded joint and/or a soldered joint, between a cable and a sheath covering the cable, in particular between a cable and a sleeve, in particular a metal sleeve, in particular a metal sleeve of a tubular cable lug, plugged onto said cable. The apparatus comprises a sonotrode connected to an ultrasonic source at least at a connecting face, and an anvil arranged opposite the working face of the sonotrode. In this case, the sonotrode and/or the anvil are configured in accordance with the invention.

It is particularly advantageous for the apparatus to additionally comprise a pressure generating device, acting on the at least one contact face, for generating a pressure acting in the direction of the anvil or a force acting in the direction of the anvil.

According to one advantageous configuration, a counterpart face, arranged opposite the working face, of the anvil has a mean roughness $R_a$ of at most 0.4 μm, preferably at most 0.1 μm. In other words, the counterpart face of the anvil is also configured in a smooth manner similar to the working face of the sonotrode. Thus, it preferably has no surface structure, for example protrusions, ribs or the like. Surprisingly, it is also possible, with a smoothly configured working face and a simultaneously smoothly configured counterpart face, to impart sufficient ultrasonic energy for producing a joint into the sheath.

The proposed apparatus is suitable in particular for connecting, in particular welding and/or welding, a cable to a tubular cable lug. A tubular cable lug comprises a metal sleeve which is closed at one end. From the closed end, a connection terminal, which is configured in the manner of a metal plate, extends. According to an advantageous configuration, the anvil has, in a surface portion adjoining the counterpart face, two parallel shoulders for retaining such a connection terminal so as to prevent it from shifting to the side. As a result of the connection terminal being placed between shoulders that are arranged in particular parallel, a rough orientation of the sheath with regard to the working face can be defined.

In a first possible variant, the sonotrode is arranged above the anvil. In a second possible variant, the anvil is arranged above the sonotrode. The sonotrode and the anvil are preferably shiftable in a closing direction relative to one another.

The apparatus may also contain at least one side slide with a side boundary surface, preferably two side slides, arranged opposite one another, with respective side boundary surfaces. The at least one side slide is preferably shiftable in a transverse direction perpendicular to the closing direction. The working face of the sonotrode, the counterpart face of the anvil and the side boundary surface of the side slide can enclose a spatial region in which the connection takes place.

In a similar manner to the shoulders, the slide slides can define a rough orientation of the sheath with regard to the working face.

The second profiles of the working face and of the counterpart face can be configured for example like the profiles of crimping tools known per se, in order in this way to achieve profiles of the sheath that are known from crimping.

The ultrasonic source expediently comprises at least one converter for generating a torsional or a longitudinal ultrasonic vibration. It can also comprise at least one booster connected between the converter and the connecting face.

According to a further aspect of the invention, a method is proposed for producing a joint, in particular a welded joint and/or a soldered joint, between a cable and a sheath covering the cable, in particular between a cable and a sleeve, in particular a metal sleeve, in particular a metal sleeve of a tubular cable lug. The method contains the following steps of:

providing an apparatus having a sonotrode according to the invention, positioning the sheath such that an axis of the sheath is approximately aligned with a groove axis of a groove in the working face, before or after the positioning of the sheath: applying the sheath to the cable, in particular plugging the sleeve onto the cable, pressing the working face against the sheath such that the axis of the sheath is aligned with the groove axis, and imparting an ultrasonic vibration into the sheath by means of the sonotrode such that the cable is connected, in particular welded and/or soldered, to the sheath at least sectionally.

In a first variant, in the sonotrode, a spacing between pressure faces of the working face is smaller than an outside diameter of the sheath. This allows a greater clamping force during centering. The ratio between the spacing of the pressure faces and the outside diameter of the sheath may be for example in the range from 0.5 to 0.9, preferably in the range from 0.6 to 0.8. In a second variant, in the sonotrode, a spacing between pressure faces of the working face is greater than an outside diameter of the sheath. In this way, it is possible, with one and the same sonotrode, also to connect sheaths with different outside diameters to respective cables. Furthermore, the self-centering during the adjustment of the sonotrode in the direction of the anvil is improved, and more uniform force input takes place. The pressure faces can be arranged on either side of the groove and be formed in a protruding and in particular humplike manner.

If the sheath is a wrapping, the application can take place by wrapping the cable with the wrapping.

The axis of the sheath corresponds to the direction of longitudinal extent thereof. When the sheath is configured in a cylindrical manner, the axis corresponds to the axis of rotation.

The expression "approximately aligned" is understood as meaning that the axis of the sheath forms an angle of at most 60°, preferably at most 45°, particularly preferably at most 30°, with the axis of the sonotrode.

In a possible variant, the positioning of the sheath, in particular of the sleeve, takes place by placing the sheath on an anvil arranged opposite the working face. In another possible variant, the positioning of the sheath takes place by placing the sheath on the working face of the sonotrode.

In contrast to the prior art, in the method according to the invention, the metal sleeve rests on the anvil or the sonotrode in a movable manner. The sheath is in particular not fastened in a clamped manner to the anvil before it comes into contact with the working face, and it is also not fastened in a clamped manner to the sonotrode before it comes into contact with the counterpart face of the anvil. It is oriented by the working face or counterpart face lowered onto the sheath, by means of the concave curvature provided in the working face. Subsequently, the working face is pressed into the sheath and ultrasonic vibrations imparted, with the result that a joint, in particular a welded joint and/or a soldered joint, is produced within the sheath with the cable covered thereby, in particular with the cable plugged therein.

According to an advantageous configuration of the invention, the sheath is placed onto the counterpart face of the anvil, wherein the counterpart face has the abovementioned mean roughness $R_a$.

The metal sleeve is advantageously a constituent part of a tubular cable lug having a connection terminal. In this case, the connection terminal can be laid between the shoulders of the anvil.

The imparted ultrasonic vibration is expediently a torsional ultrasonic vibration, such that the working face is moved back and forth in a direction perpendicular to the torsion axis of the sonotrode and/or to the axis of the sheath. However, the imparted ultrasonic vibration can also be a longitudinal ultrasonic vibration, such that the working face is moved back and forth in a direction parallel to the axis of the sonotrode and/or to the axis of the sheath.

Exemplary embodiments of the invention are explained in more detail in the following text with reference to the drawings, in which:

FIG. 1 shows a first side view of a first sonotrode,

FIG. 2 shows a front view of the first sonotrode,

FIG. 3 shows a rear view of the first sonotrode,

FIG. 4 shows a plan view of the first sonotrode,

Figure 5:
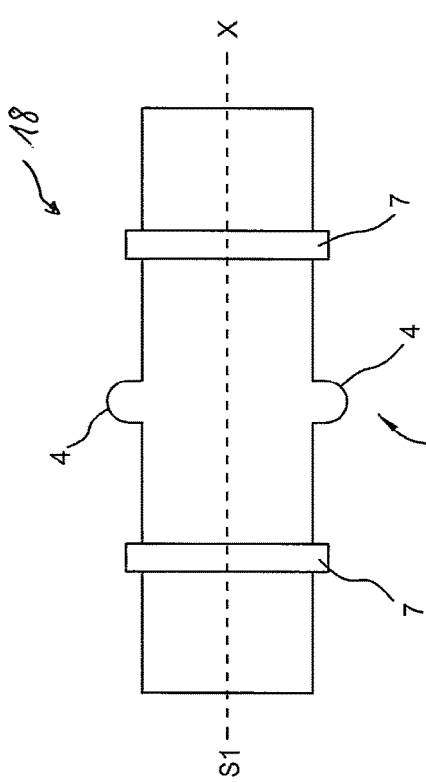
FIG. 5 shows a side view of a second sonotrode.
Figure 8:
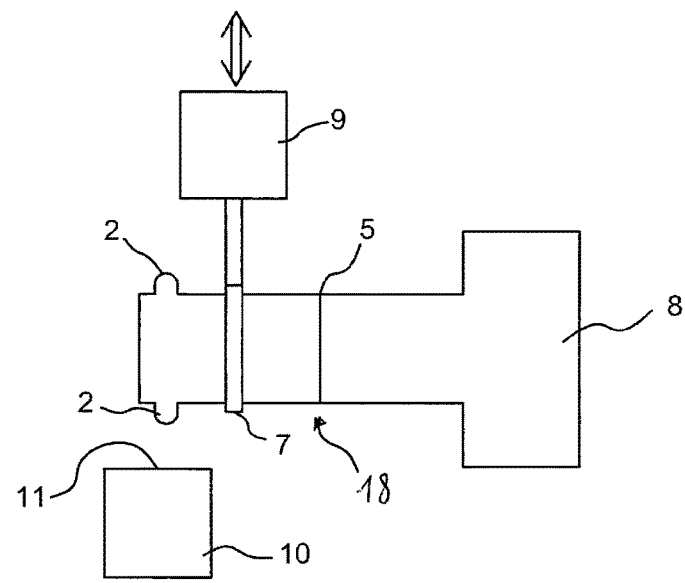
Figure 9:
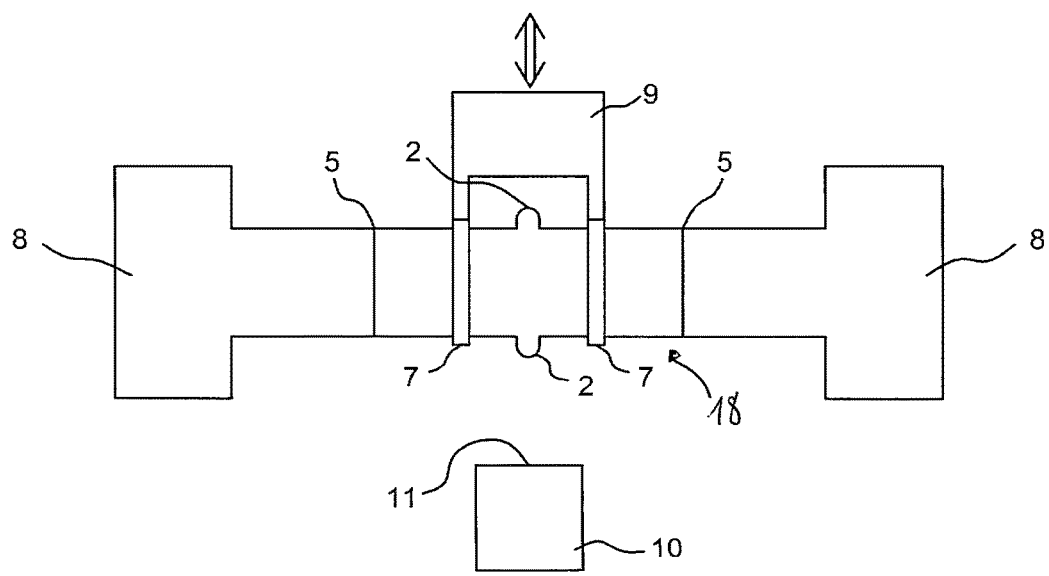
Figure 10:
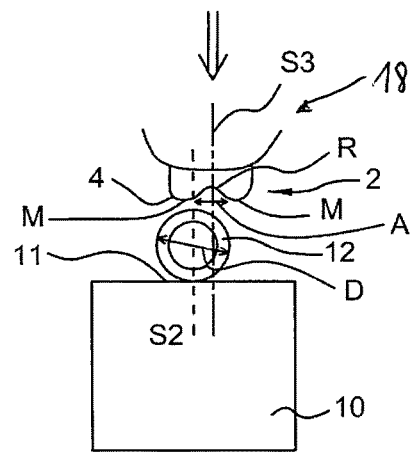
Figure 11:
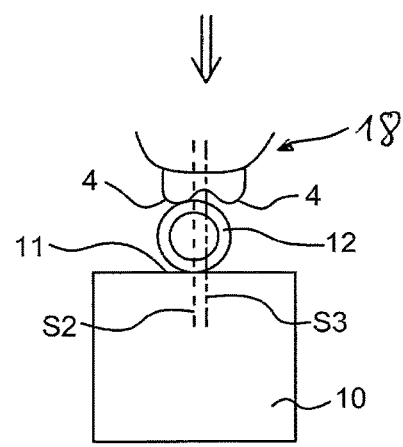
Figure 12:
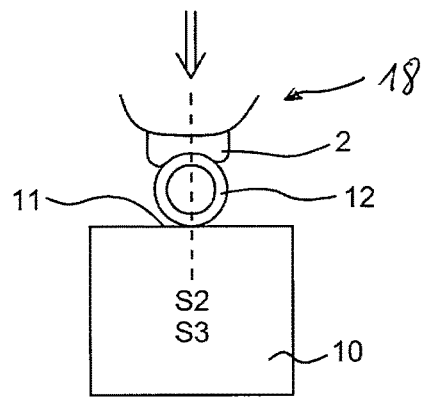
Figure 13:
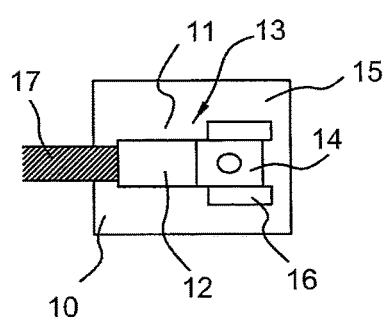
Figure 14:
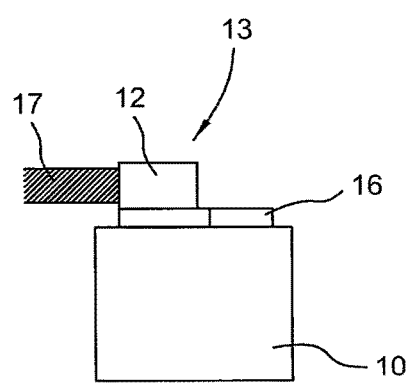
Figure 15:
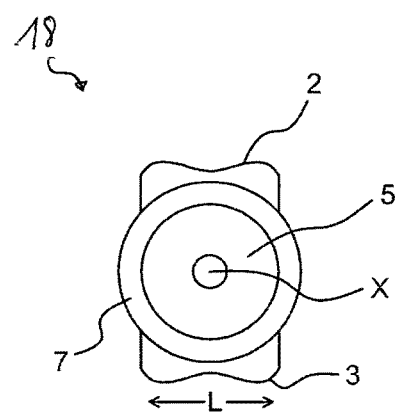
Figure 16:
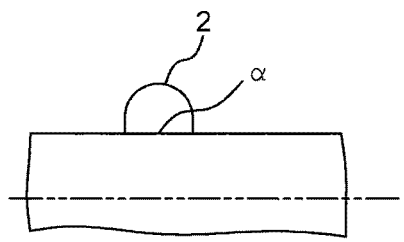
Figure 17:
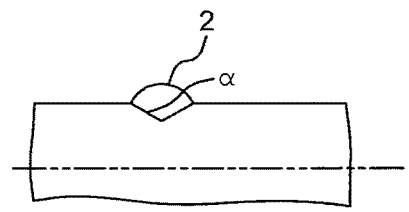
Figure 19:
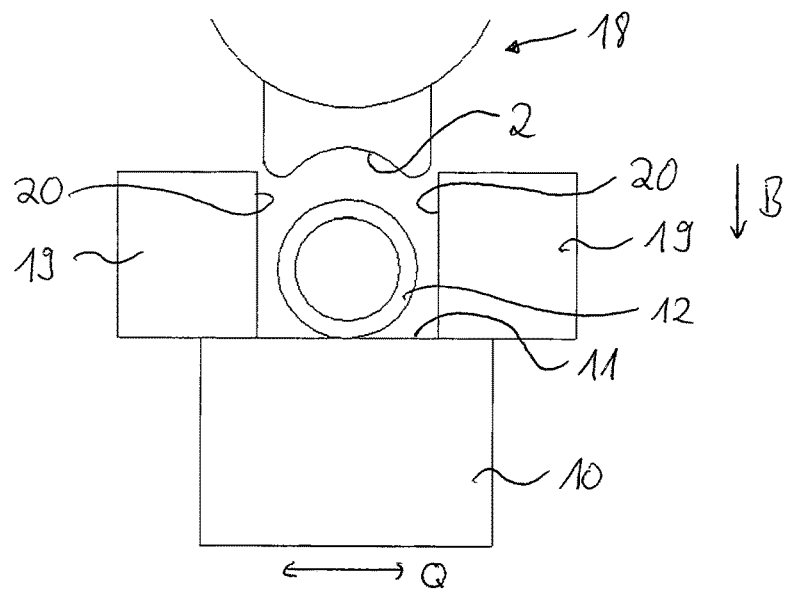
Figures 20A, 20B:
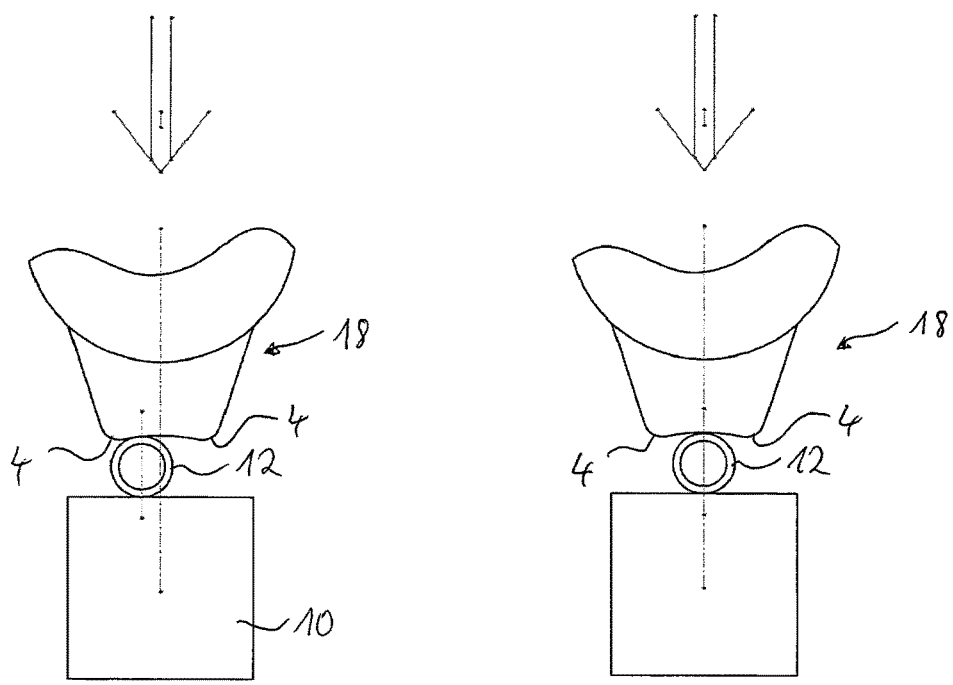

FIG. 8 schematically shows a first ultrasonic welding device,

FIG. 9 schematically shows a second ultrasonic welding device,

FIG. 10 shows the orientation of the metal sleeve as the working face approaches, FIG. 11 shows the orientation of the metal sleeve as the working face makes contact, FIG. 12 shows the orientation of the metal sleeve as the working face is pressed in, FIG. 13 shows a plan view of an anvil with a tubular cable lug, FIG. 14 shows a side view according to FIG. 13, FIG. 15 shows a front view of a third sonotrode, FIG. 16 shows a detail view of the second sonotrode according to FIG. 5, and FIG. 17 shows a view in partial section through a fourth sonotrode, FIG. 18a-d show sectional views of four pairs of sonotrodes and anvils for producing different profiles;

FIG. 19 shows an ultrasonic welding device with two side slides;

FIG. 20a/b show an ultrasonic welding device in which the spacing between pressure faces of the working face is greater than the outside diameter of the sheath, before and after centering.

FIGS. 1 to 4 show views of a first sonotrode according to the invention. The first sonotrode has a first plane of symmetry S1. The masses are distributed symmetrically with regard to the first plane of symmetry S1. An axis X of the first sonotrode lies in the first plane of symmetry S1. The axis X corresponds to an axis of rotation of a cylindrical portion of the first sonotrode. Working faces 2 extend in a manner arranged opposite one another from a cylindrical shaft 1 of the sonotrode.

FIG. 1 shows a first profile of the working faces 2. The first profile extends parallel to the axis X. The working faces 2 have a convex curvature in the first profile. They are configured in the manner of a full bead here.

As is apparent in particular from FIGS. 2 to 4, the working faces 2 extend perpendicularly to the axis X. In a second profile, likewise extending perpendicularly to the axis X, each of the working faces 2 has a concave portion, or a groove 3, which is delimited on either side by protruding humplike pressure faces 4. Each pressure face 4 has a central point M in plan view (see FIG. 4). A groove axis R connects the lowest points of the groove 3. The first sonotrode has a first connecting face 5 with a threaded bore 6. Furthermore, the first sonotrode is provided with an encircling contact face 7 which, between the first connecting face 5 and the working faces 2, extends radially from the shaft 1.

Figure 6:
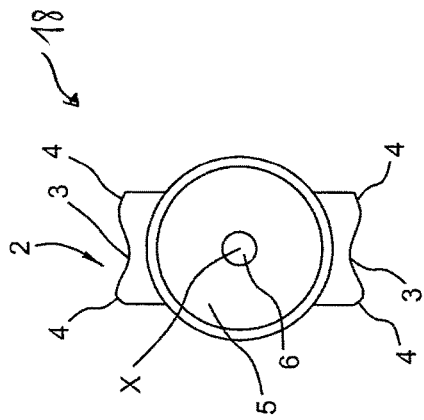
FIG. 6 shows a front or rear view of the second sonotrode.
Figure 7:
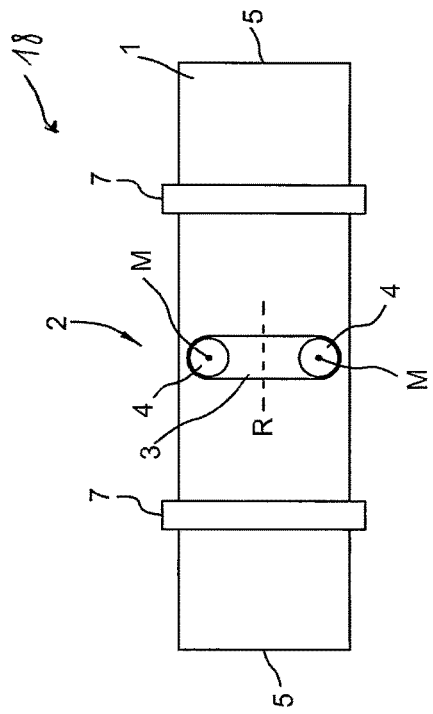
FIG. 7 shows a plan view of the second sonotrode.

The second sonotrode according to the invention, shown in FIGS. 5 to 7, differs from the first sonotrode substantially in that both the front side of the sonotrode and the rear side thereof each have a connecting face 5 in this case. Respective contact faces 7 are provided between each connecting face 5 and the working face 2. The working face 2 is in this case fitted on the cylindrical shaft 1 centrally between the two connecting faces 5.

A surface of the pressure faces 4 has a mean roughness $R_a$ of at most 0.1 μm. The groove 3, too, can have a mean roughness $R_a$ of at most 0.1 μm. Preferably, the working face 2 is polished.

FIG. 8 schematically shows a first ultrasonic welding apparatus according to the invention. An ultrasonic source 8 is in this case connected to the first sonotrode, shown in FIGS. 1 to 4, at the connecting face 5 thereof. The reference sign 9 schematically denotes a pressure generating device which acts on the contact face 7 of the first sonotrode. The reference sign 10 denotes an anvil which has a counterpart face 11 located opposite the working face 2.

FIG. 9 shows a schematic view of a second ultrasonic welding apparatus according to the invention. In this case, the second sonotrode, shown in FIGS. 5 to 7, is connected to an ultrasonic source 8, in each case at the connecting faces 5 thereof. The pressure generating device 9 is in this case supported on two contact faces 7.

The function of the ultrasonic welding apparatuses will now be explained in more detail in particular in conjunction with FIGS. 10 to 14.

By means of the pressure generating device 9, the working face 2 of the sonotrode is moved in the direction of the counterpart face 11 of the anvil 10. Located on the smoothly configured counterpart face 11 of the anvil 10 is a metal sleeve 12, which is for example a constituent of a tubular cable lug 13. The metal sleeve 12 has a second plane of symmetry S2. The second plane of symmetry S2 is, as the working face 2 approaches, first of all not aligned with a third plane of symmetry S3, which extends perpendicularly to the first plane of symmetry S1 through the axis X of the sonotrode. The groove axis R is preferably located in the third plane of symmetry S3.

A spacing between the two central points M of the pressure faces 4 is designated by the reference sign A. The reference sign D designates an outside diameter of the metal sleeve 12. The spacing A is smaller than the outside diameter D of the metal sleeve 12 in this exemplary embodiment. The following relationship preferably applies:

$A=k*D$, where k is a factor in the range from 0.5 to 0.9, preferably 0.6 to 0.8.

As soon as one of the pressure faces 4 comes into contact with the outer circumference of the metal sleeve 12, upon further movement of the pressure face 4 in the direction of the counterpart face 11, the metal sleeve 12 is shifted such that the second plane of symmetry S2 thereof is aligned with the third plane of symmetry S3 of the sonotrode (see FIGS. 11 and 12). By way of the pressure generating device 9, the working face 2 is then pressed into the metal sleeve 12 and an ultrasonic vibration is imparted by means of the sonotrode.

FIGS. 13 and 14 show a configuration of an anvil 10 on which a tubular cable lug 13 has been placed. The tubular cable lug 13 has a metal sleeve 12, which rests on the smooth counterpart face 11. In a surface portion 15 adjacent to the counterpart face 11, the anvil 10 has two parallel shoulders 16. From the metal sleeve 12 there extends a connection terminal 14. As a result of the connection terminal 14 being placed between the parallel arranged shoulders 16, a rough orientation of the metal sleeve 12 with regard to the working face 2 is defined. A spacing between the shoulders 16 is expediently selected such that the connection terminal 14 can be shifted to the side in a defined range. A cable 17 has been plugged into the metal sleeve 12. The metal sleeve 12 forms a sheath of the cable 17 in this. The tubular cable lug 13 can be nickel-plated.

With the sonotrode according to the invention, a reproducible and firm welded joint and/or soldered joint between a metal sleeve 12 and a cable 17 plugged into the latter is produced in particular when the torsional ultrasonic welding method is used. The cable 17 can be in particular a litz wire, for example made of copper or aluminum. With the proposed ultrasonic welding apparatus, a cable 17 can be welded and/or soldered to a tubular cable lug 13 without the surface of the connection terminal 14 being damaged, in particular scratched. The lack of surface structures on the working face 2 and on the counterpart face 11 additionally has the effect that the friction between the sonotrode, metal sleeve 12 and anvil 10 is increased and as a result the development of heat is enhanced. It is currently assumed that, as a result, a cohesive connection is achieved in the interior of the metal sleeve 12 in cooperation with the welding force applied. Furthermore, the lack of a surface structure has the advantage that the wear to the working face 2 and the counterpart face 11 is reduced. As a result, longer and greater energy input is possible. Such wear is particularly pronounced in particular in nickel-plated tubular cable lugs 13, and this can be prevented by the invention.

In the third sonotrode shown in FIG. 15, the working face 2 has a concave curvature along its entire length L in the second profile shown here. A shortest distance between the mutually opposite lines of curvature of the two working faces 2 advantageously intersects the axis X.

FIG. 16 shows a detail view according to FIG. 5. It is apparent therefrom that, in the first profile shown here, the working face 2 is curved through an angle α of 180°.

In the fourth sonotrode shown in FIG. 17, the working face 2 is, by contrast, curved only through an angle α of about 100° in the first profile.

Figure 18A:
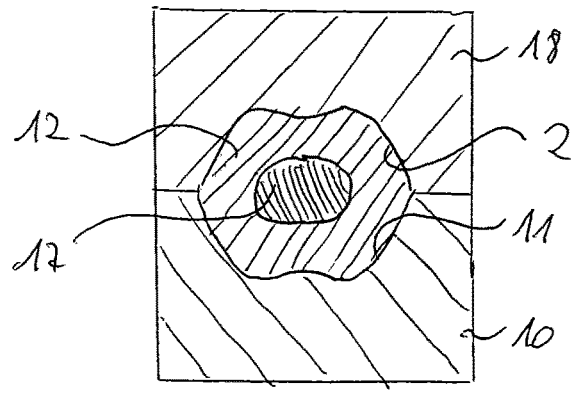
Figure 18B:
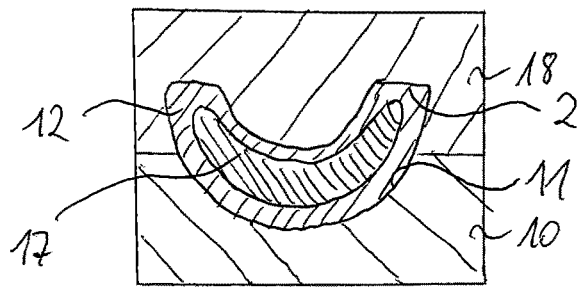
Figure 18C:
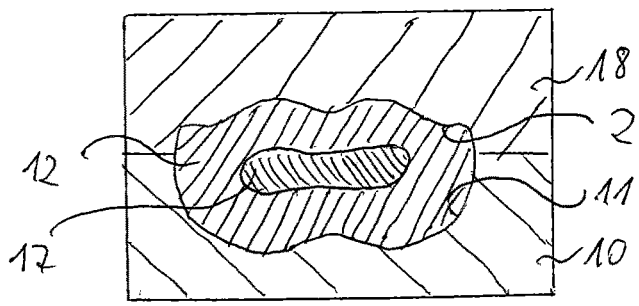
Figure 18D:
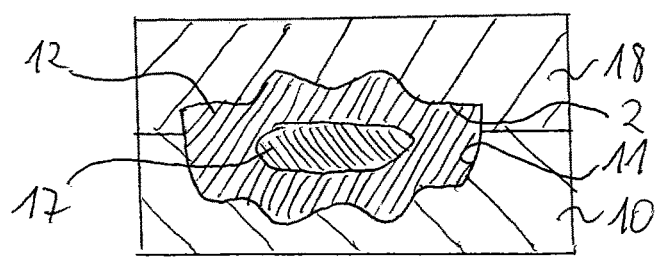

FIGS. 18a to 18d illustrate four pairs of sonotrodes 18 and anvils 10 in sectional views, in which the second profile is visible. The metal sleeves 12 and cables 17 can likewise be seen after being connected. In FIGS. 18a, 18c and 18d, the second profiles of sonotrodes 18 and anvil 10 each have both convex and concave portions. In FIG. 18b, only the second profile of the anvil 10 has a convex profile, but not also the second profile of the sonotrode 18.

FIG. 19 shows a further welding device according to the invention, which, apart from a sonotrode 18 and an anvil 10, contains two side slides 19, arranged opposite one another, each with a side boundary surface 20. The sonotrode 18 is shiftable in the direction of the anvil 10 in a closing direction B that is vertical in this case. The side slides 19 are shiftable in a transverse direction Q perpendicular to the closing direction B. The working face 2 of the sonotrode 18, the counterpart face 11 of the anvil 10, and the side boundary surfaces 20 of the side slides 10 enclose a spatial region in which the connection takes place. The side slides 19 define a rough orientation of the metal sleeve 12 with regard to the working face 2.

In the ultrasonic welding apparatus illustrated in FIGS. 20a and 20b, the spacing between pressure faces 4 of the working face 12 of the sonotrode 18 is greater than the outside diameter of the metal sleeve 12. In this way, with one and the same sonotrode 18, it is also possible to connect metal sleeves 12 with different outside diameters to respective cables. Furthermore, the self-centering upon adjustment of the sonotrode 18 in the direction of the anvil 10 is improved, and a more uniform force input takes place. FIG. 20a shows the state before centering and FIG. 20b shows the state after centering.

The invention claimed is:

1. A torsion sonotrode having a torsion axis for producing a joint between a cable and a sheath covering the cable, the sonotrode having at least one working face, wherein the working face is concavely curved in a cross-sectional plane perpendicular to the torsion axis forming a single groove along a length of the working face;
   a symmetrical mass distribution with regard to a first plane of symmetry; and
   at least one connecting face for connecting to an ultrasonic source for applying a torsional vibration, such that the working face is moved back and forth in a direction perpendicular to the torsion axis of the sonotrode to produce the joint between the cable and the sheath;
   the torsion axis extending through the connecting face and the first plane of symmetry;
   the single groove being configured to align the sheath such that an axis of the sheath is approximately aligned with the groove in the working face when the working face is pressed against the sheath.

2. The sonotrode as claimed in claim 1, wherein the working face is convexly curved at least sectionally in a second profile extending parallel to the torsion axis.

3. The sonotrode as claimed claim 1, wherein the first profile has a groove which is configured such that when a pressure or a force is exerted on the sheath by the working face, the sheath is forced into a defined position with respect to the working face.

4. The sonotrode as claimed in claim 3, wherein the working face has, in each case, a protruding and pressure face on either side of the groove.

5. The sonotrode as claimed in claim 1, wherein a surface of the working face has a mean roughness (Ra) of at most 0.4 µm.

6. An apparatus for producing a joint between a cable and a sheath covering the cable, the apparatus comprising:

a sonotrode connected to an ultrasonic source at least at a connecting face, and an anvil arranged opposite the working face of the sonotrode, wherein the sonotrode is configured as claimed in claim 1.

7. The apparatus as claimed in claim 6, wherein a counterpart face of the anvil, arranged opposite the working face, has a mean roughness (Ra) of at most 0.4 μm.

8. The apparatus as claimed in claim 6, wherein the anvil has two parallel shoulders, in a surface portion adjoining the counterpart face, for retaining a connection terminal so as to prevent the connection terminal from shifting to the side.

9. A method for producing a joint between a cable and a sheath covering the cable, the method comprising:

providing an apparatus having a sonotrode as claimed in claim 1, positioning the sheath such that an axis of the sheath is approximately aligned with a groove axis of the groove in the working face, applying the sheath, either before or after the positioning of the sheath, to the cable, pressing the working face against the sheath such that the axis of the sheath is aligned with the groove axis, and imparting an ultrasonic vibration into the sheath by the sonotrode such that the cable is at least sectionally connected to the sheath using a torsional vibration such that the working face is moved back and forth in a direction perpendicular to the torsion axis of the sonotrode to produce the joint between the cable and the sheath.

10. The method as claimed in claim 9, wherein, in the sonotrode, a spacing between pressure faces of the working face is smaller than an outside diameter of the sheath.

11. The method as claimed in claim 9, wherein, in the sonotrode, a spacing between the pressure faces of the working face is greater than an outside diameter of the sheath.

12. The method as claimed in claim 9, wherein positioning of the sheath takes place by placing the sheath on an anvil arranged opposite the working face.

13. The method as claimed in claim 9, wherein the sheath is a constituent part of a tubular cable lug having a connection terminal.

14. The method as claimed in claim 13, wherein the connection terminal is laid between shoulders of the anvil.

15. The method as claimed in claim 9, wherein the cable is at least one of welded and soldered to the sheath at least sectionally and the joint is at least one of a welded joint and a soldered joint.

16. The method as claimed in claim 15, wherein the sheath is a sleeve.

17. The method as claimed in claim 16, wherein the sleeve is a metal sleeve.

* * * * *